US007510358B2

(12) United States Patent
Brewster

(10) Patent No.: US 7,510,358 B2
(45) Date of Patent: Mar. 31, 2009

(54) CONTAINER SECUREMENT DEVICE AND SYSTEM

(76) Inventor: John B. Brewster, 2060 Hawthorne Rd., Homewood, IL (US) 60430-1109

( * ) Notice: Subject to any disclaimer, the term of this patent is extended or adjusted under 35 U.S.C. 154(b) by 445 days.

(21) Appl. No.: 11/451,282

(22) Filed: Jun. 12, 2006

(65) Prior Publication Data

US 2007/0212183 A1    Sep. 13, 2007

Related U.S. Application Data

(63) Continuation-in-part of application No. 11/372,670, filed on Mar. 10, 2006.

(51) Int. Cl.
*B60P 7/08* (2006.01)
(52) U.S. Cl. .............................. 410/69; 410/70; 410/82
(58) Field of Classification Search ................ 410/69, 410/70, 71, 76, 82; 248/500, 503; 24/287; 280/406.1
See application file for complete search history.

(56) References Cited

U.S. PATENT DOCUMENTS

| 4,597,701 | A | * | 7/1986 | DeWitt | ......................... 410/84 |
|---|---|---|---|---|---|
| 4,626,155 | A | | 12/1986 | Hlinsky et al. | |
| 4,993,125 | A | | 2/1991 | Capron et al. | |
| 5,106,247 | A | | 4/1992 | Hove et al. | |
| 5,115,933 | A | | 5/1992 | Gerhard | |
| 5,142,834 | A | | 9/1992 | Laclave et al. | |
| 5,183,375 | A | | 2/1993 | Fenton et al. | |
| 5,257,440 | A | | 11/1993 | Bardou et al. | |
| 5,297,498 | A | | 3/1994 | Donner | |
| 5,320,046 | A | | 6/1994 | Hesch | |
| 5,560,088 | A | | 10/1996 | Nitsche et al. | |
| 5,570,981 | A | | 11/1996 | Brewster | |
| 5,676,271 | A | | 10/1997 | Reynard | |
| D385,775 | S | | 11/1997 | Reynard | |
| 5,765,977 | A | | 6/1998 | Reynard | |
| 6,237,794 | B1 | | 5/2001 | Fenton et al. | |
| 6,490,766 | B1 | | 12/2002 | Tiemann | |
| 6,519,816 | B1 | | 2/2003 | Tagaguchi et al. | |
| 6,560,828 | B1 | | 5/2003 | Gloystein | |
| 6,692,203 | B2 | | 2/2004 | Kim et al. | |

OTHER PUBLICATIONS

Holland, L.P., "Model: 68830, Automatic Twist Lock for Containers on Rail Cars", two-page brochure, published by Holland, L.P., Crete, Illinois, U.S.A.

* cited by examiner

*Primary Examiner*—Stephen Gordon
(74) *Attorney, Agent, or Firm*—Meroni & Meroni, P.C.; Charles F. Meroni, Jr.; Christopher J. Scott

(57) ABSTRACT

A container securement device enables a user to secure a cargo container to a carrier deck. The device includes a base having a projecting shear block received in the lock-actuating opening of the container. A shaft-mounted head rotates between an unlocked or loading position in which the head moves through the locking opening and a locked position in which the container is secured. Automatic entry and release are provided by a selected interchangeable spring element within the base biasing the head to the locked position but permitting movement to the unlocked position when torque is applied by engagement of the container with a cam surface on the head. The spring element may be interchanged as may be required by anticipated climactic and/or temperature conditions. Each spring element is actuable by a uniquely configured shaft member having a spring-receiving end capable of cooperating with at least two types of springs.

10 Claims, 15 Drawing Sheets

CONTAINER SECUREMENT DEVICE AND SYSTEM

PRIOR HISTORY

This application is a continuation-in-part patent application claiming priority to pending U.S. patent application Ser. No. 11/372,670, filed in the United States Patent and Trademark Office on Mar. 10, 2006.

BACKGROUND OF THE INVENTION

1. Field of the Invention

The present invention relates to container securement devices and more particularly to improvements in cargo container securement devices providing automatic securement and release of a cargo container.

2. Discussion of Prior Art

Containerized lading has become immensely popular due to advantages such as labor savings resulting from decreased cargo handling. Modular or standardized containers may be shipped from point to point using a variety of different carriers including rail cars, trucks and ships. Such cargo containers are conventionally provided with corner castings including locking openings used in securing the containers to the various types of vehicles upon which they are loaded.

One type of container securement device used in the past is a container pedestal including a base portion upon which a corner of the container rests, as well as vertically extending walls within which a corner of the container is captured. A latch pivotable about a horizontal axis engages a locking opening in a vertical wall of the container for holding the container down against the base while permitting automatic entry and release of the container. One example of such a container pedestal is disclosed in U.S. Pat. No. 4,382,734.

Another securement device used in the past with cargo containers is a twistlock. This device includes a base upon which the container may rest together with a shear block engageable with a locking opening in the bottom, horizontal wall of the container corner casting. A locking head is manually moved from a released position in alignment with the shear block to a locked position in which the container cannot be lifted away from the base. The head is rotated manually between the locked and the unlocked positions, and automatic entry and release of the container is not possible.

The primary use of container pedestals has been on rail cars where containers are typically loaded and unloaded with a crane and automatic entry and release are important. On the other hand, twistlocks have primarily been used to secure containers to trucks where their small size and light weight is an advantage.

U.S. Pat. No. 4,626,155 ('115 Patent), which issued to Hlinsky, et al., discloses an automatic container securement device with a spring biased, cam surfaced head. The '55 Patent teaches a device for automatically securing a cargo container to a support such as a deck of a vehicle or a second container with which the first container is to be stacked. The device includes a base having a projecting shear block received in the locking opening of the container. A head rotates between an unlocked or loading position in which the head moves through the locking opening and a locked position in which the container is secured. Automatic entry and release are provided by a spring within the base biasing the head to the locked position but permitting movement to the unlocked position when torque is applied by engagement of the container with a cam surface on the head. Visible indication of the locked position and positive locking of the head in the locked position may be provided. For stacked containers, two aligned shear blocks and two angularly offset heads are provided and the spring may be released for manual locking of the device to one container followed by automatic locking to the second container.

It will be seen from a further review of the above-referenced patents and other prior art generally known to exist that the prior art does not teach an automatic twist lock device comprising a uniquely configured shaft member for receiving springs of varying types, which various springs may be interchanged with one another depending on the requirements of the target location. Further, it will be seen that the prior art does not teach the use of spiral torsional springs constructed from tempered steel for effecting substantially uniform spring performance across a wide range of temperatures. The prior art thus perceives a need for an automatic twist lock device comprising a uniquely configured shaft member for receiving and actuating springs of varying types, which various springs may be interchanged with one another depending on the requirements of the target location. Moreover, the prior art perceives a need for an automatic twist lock incorporating a spiral torsional spring constructed from tempered steel for effecting substantially uniform spring performance across a wide range of temperatures.

SUMMARY OF THE INVENTION

Accordingly, among the objects of the present invention are to provide a cargo securement device providing the advantages of both a pedestal latch and a twistlock; to provide a device achieving automatic cargo container entry and release without the size, weight and expense of container pedestals; to provide cargo securement devices useful for securing a container directly to a support surface of a vehicle; to provide a container cargo securement device providing automatic entry and release without projecting horizontally beyond the container; to provide a cargo securement device having interchangeable, temperature dependent actuating elements; and to provide a cargo securement device overcoming disadvantages of those used in the past. In brief, the above and other objects and advantages of the present invention are achieved by providing a cargo container securement device for securing a cargo container to a support surface. The support surface may be associated with a vehicle such as a rail car, truck or ship.

A cargo container securement device in accordance with the invention includes a housing or base adapted to be fixed to the support surface. A shaft is rotatable around an axis extendable through the housing and a cam outer head surface is carried by the shaft and is adapted to move through the cargo container locking opening. The head has a shape permitting it to move through the locking opening when the cam head is in a first rotational position. When the head is in a second angularly offset position, it cannot move through the opening and serves to secure the container against the housing or base. A spring is connected between the shaft and the housing to resiliently bias the head to the second position while permitting rotation to the first position in response to the application of torque. Upper and lower surfaces of head are engageable with the locking opening to apply torque to the head as the head moves through the locking opening of the cargo container.

The present invention thus provides a container securement assembly for securing a container to a support, which container has a lock-actuating opening, and which lock-actuating opening has opposing head-engaging portions. The container securement assembly comprises a base, a shaft, a head, and certain select torsional spring elements. The base is adapted to be secured to the support and comprises a spring-receiving cavity and spring end-fixing means. The shaft is supported by the base and is thereby rotatable about an axis of rotation extendable through the lock-actuating opening. The shaft comprises a head-receiving end and a transversely non-circular spring-receiving end. The spring-receiving end extends into the spring-receiving cavity and comprises certain spring-actuable end-receiving structure such as an aperture or groove extending transversely through the spring-receiving end. The head is carried by the head-receiving end and is adapted to rotate through the lock-actuating opening under forceful contact with the head-engaging portions. The head comprises an upper locking surface and a lower unlocking surface, which differ in their locking/unlocking dynamic(s).

The selected torsional spring element is received in the spring-receiving cavity and comprises a central shaft interface for interfacing with the end-receiving structure. The torsional spring element is thereby made actuable intermediate the spring-receiving end and the spring end-fixing means by container-provided forces as the head-engaging portions contact the head. The head-engaging portions thus apply torque to the shaft via the head, the head being movable through the lock-actuating opening when in an actuated, unlocked, rotational head position and immovable through the lock-actuating opening when in a relaxed, locked rotational head position. The locked rotational head position functions to prevent movement of the head through the lock-actuating opening for enabling the user to selectively secure the container to the support.

BRIEF DESCRIPTION OF THE DRAWINGS

Other features of my invention will become more evident from a consideration of the following brief description of patent drawings, as follows:

FIG. No. 1 is a fragmentary perspective view of a support surface and a number of cargo containers to be supported by container securement devices of the present invention FIG. No. 2 is a fragmentary, bottom perspective view of a container outfitted with a head-actuating opening.

Figure 1:
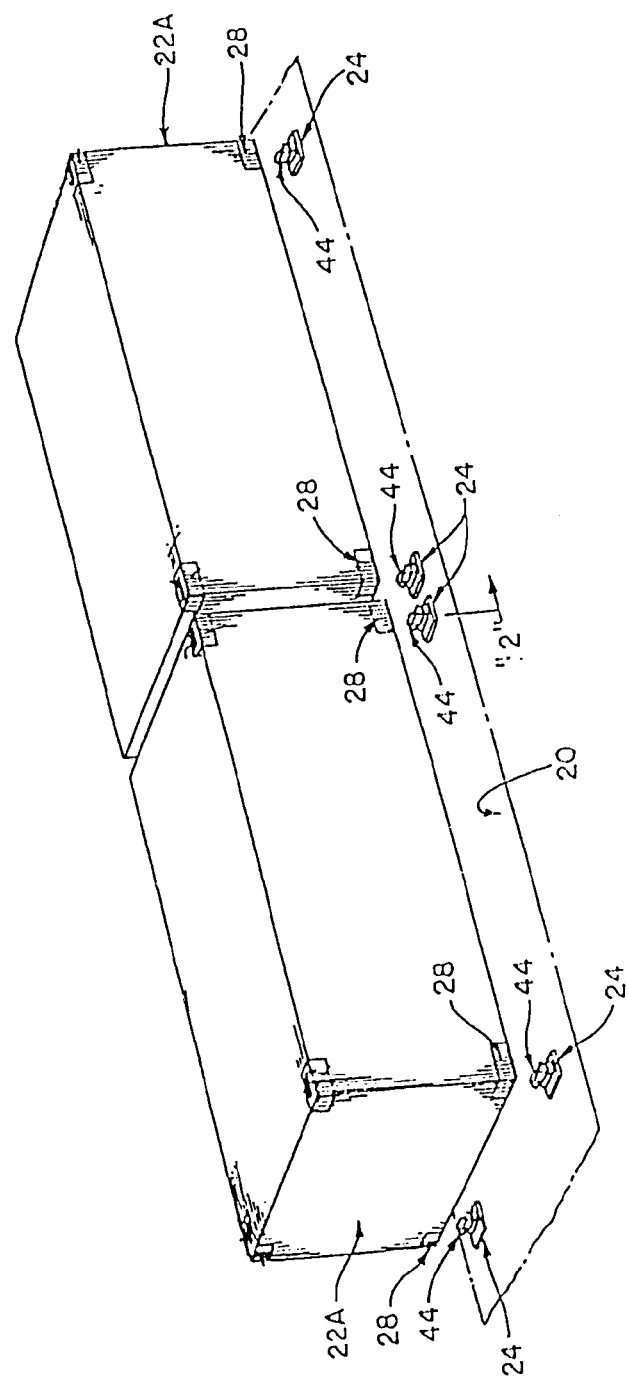
Figure 2:
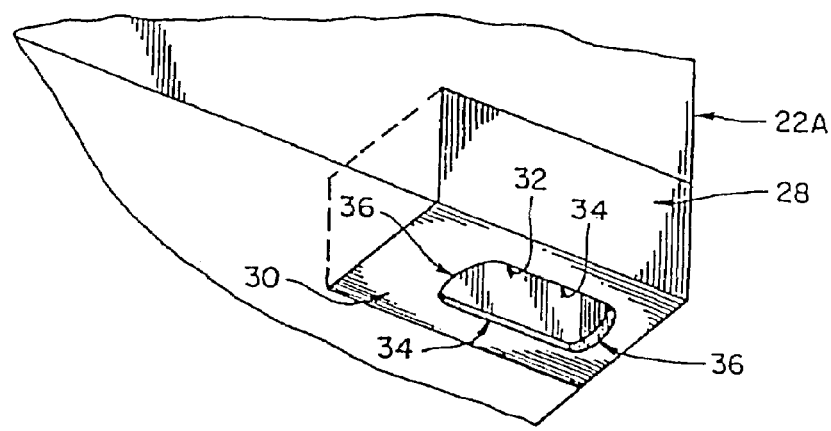
Figure 3:
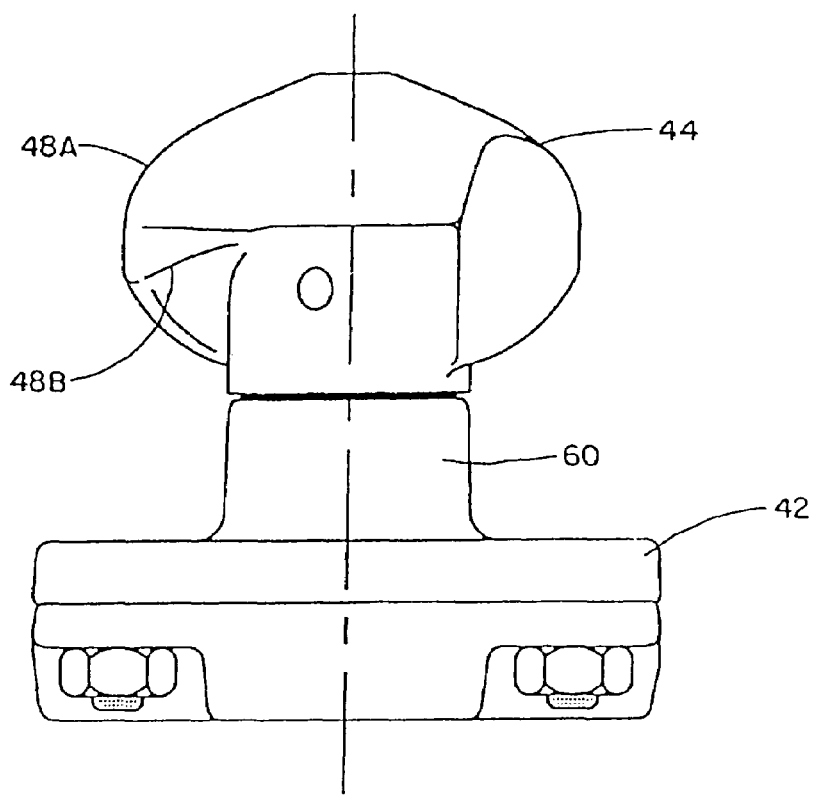
Figure 4:
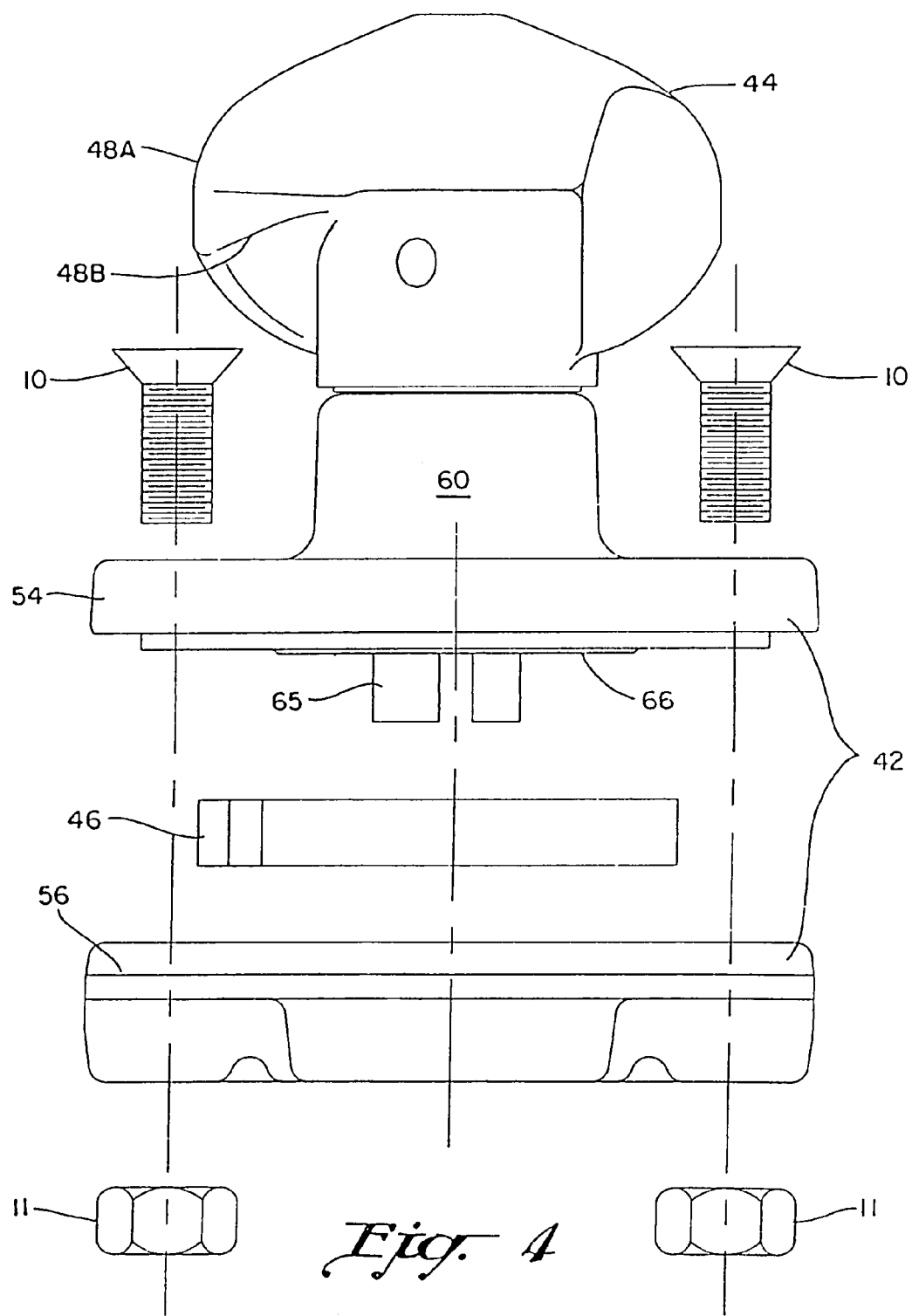
Figure 5:
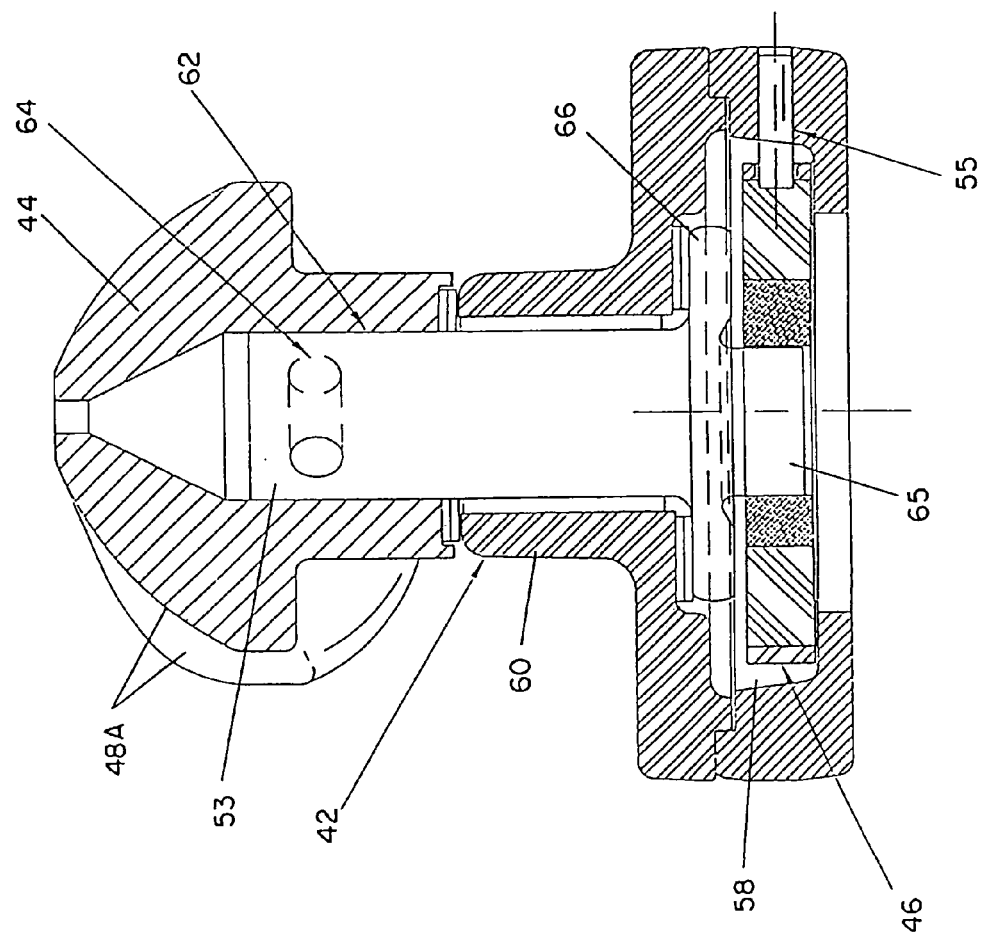
Figure 6:
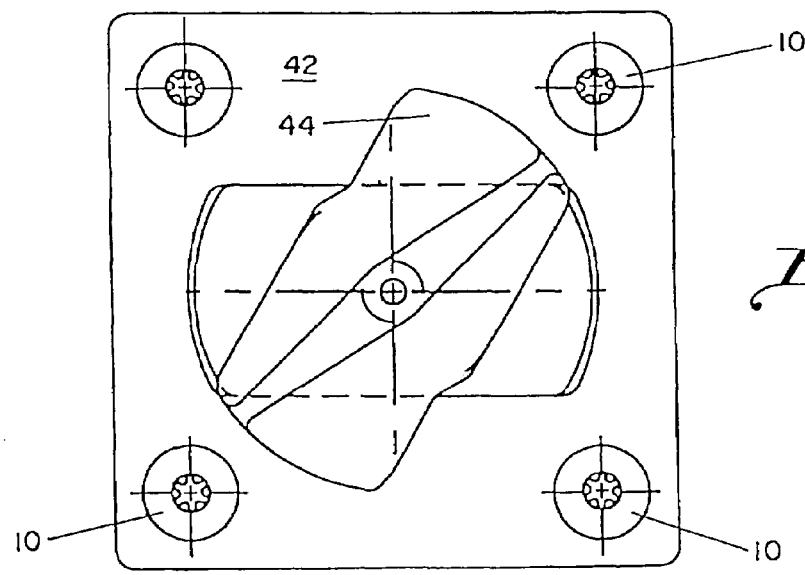
Figure 7:
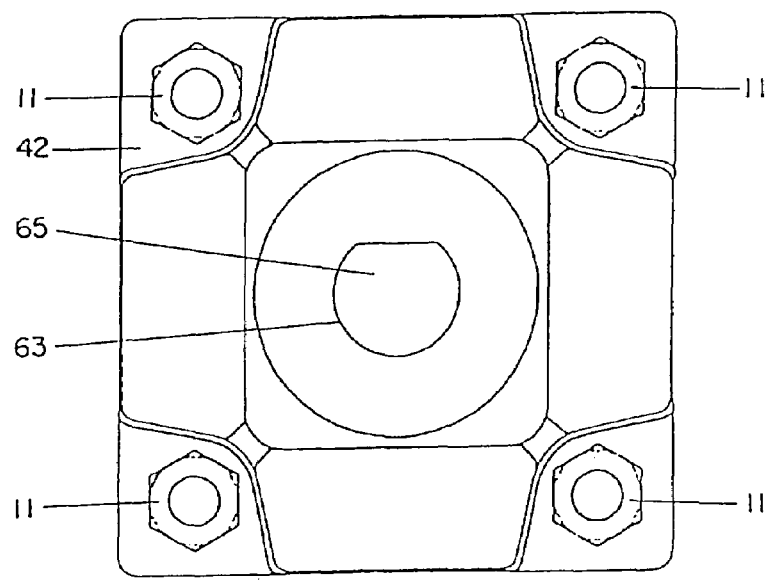
Figure 8:
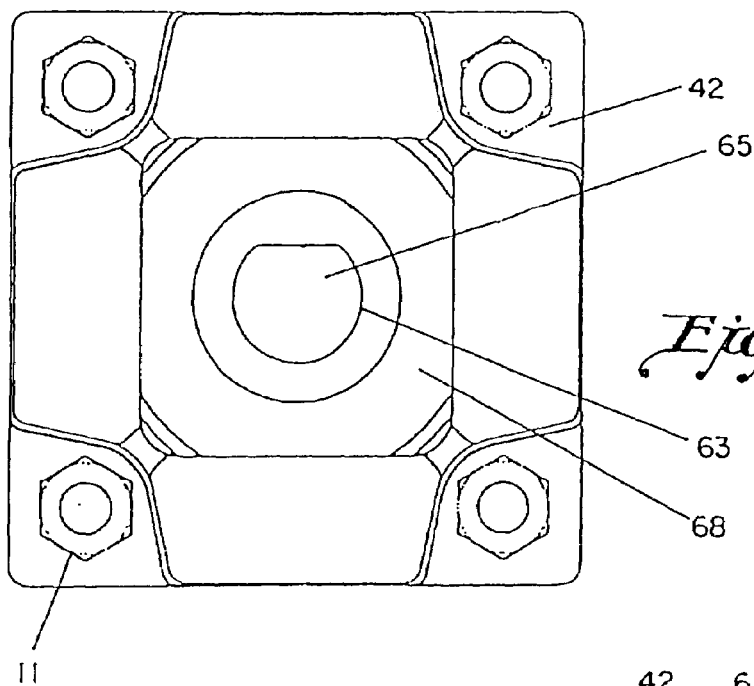
Figure 9:
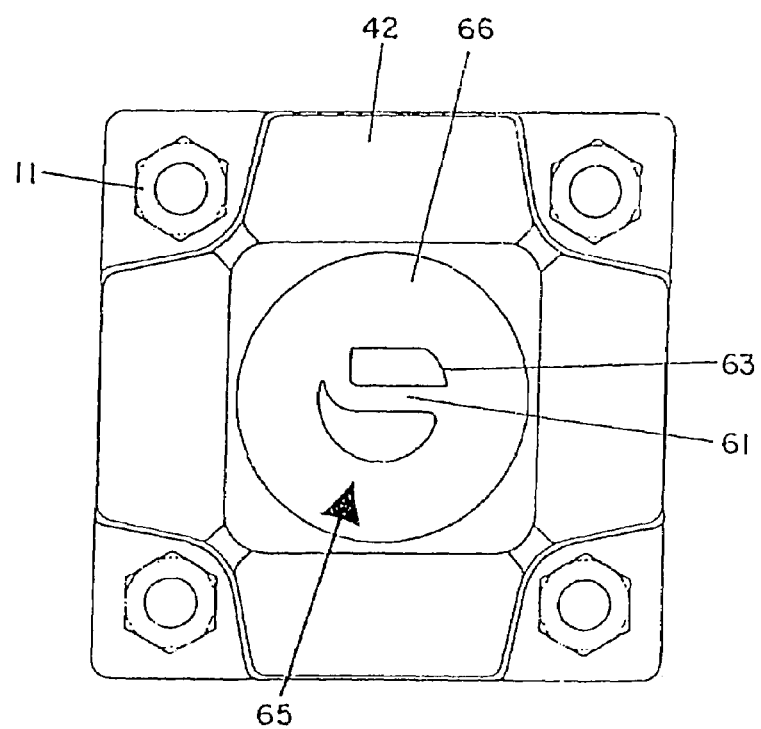
Figure 10:
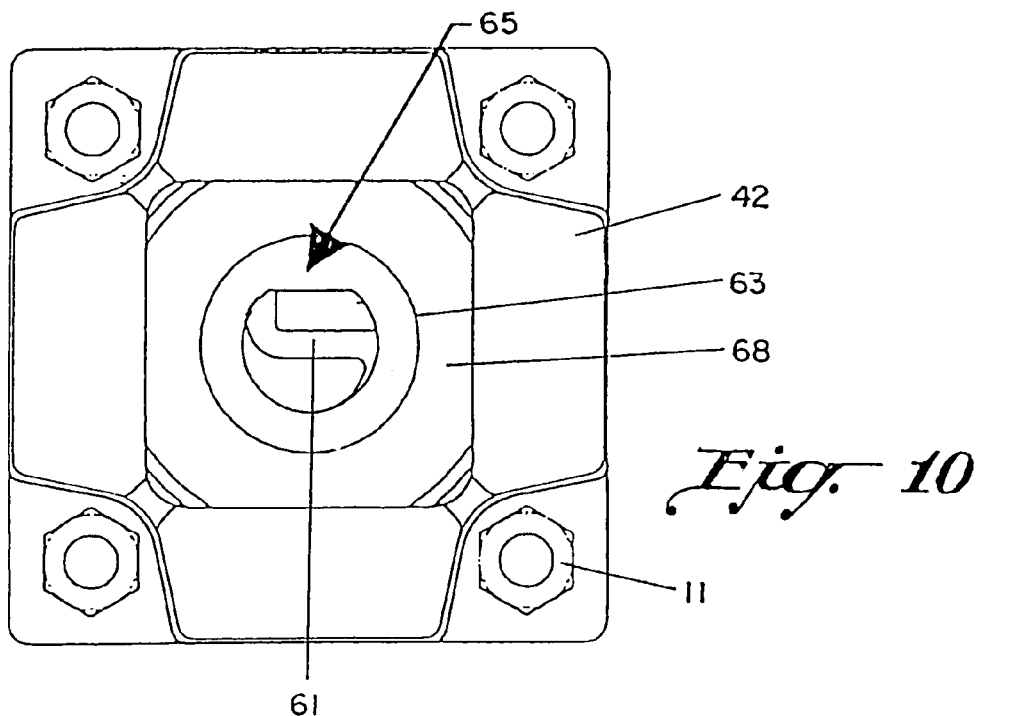
Figure 11:
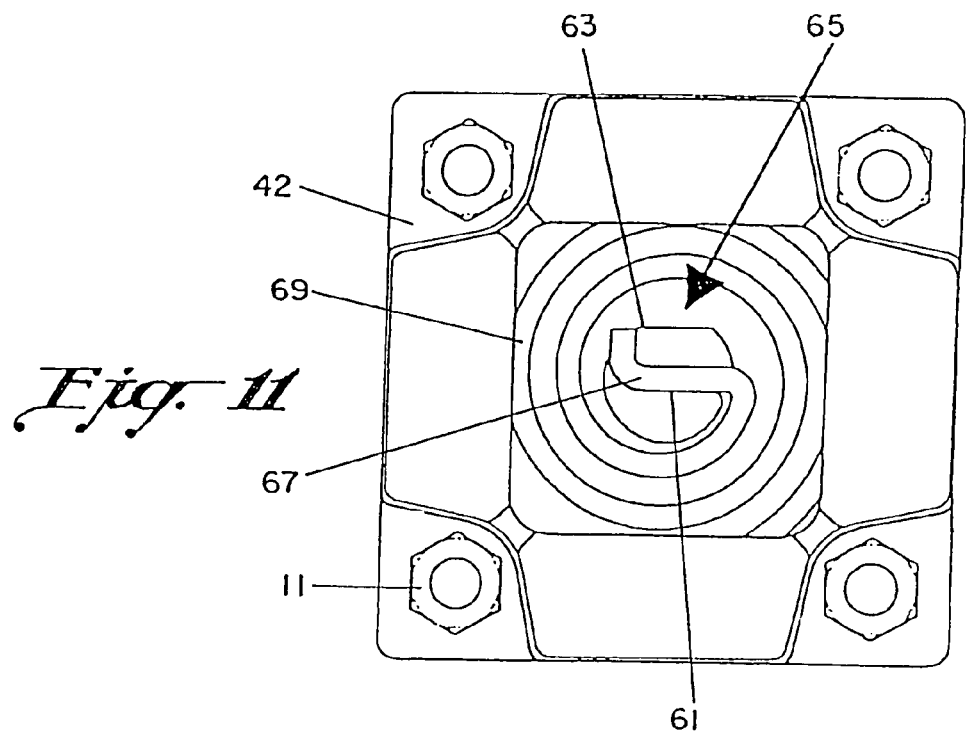
Figure 12:
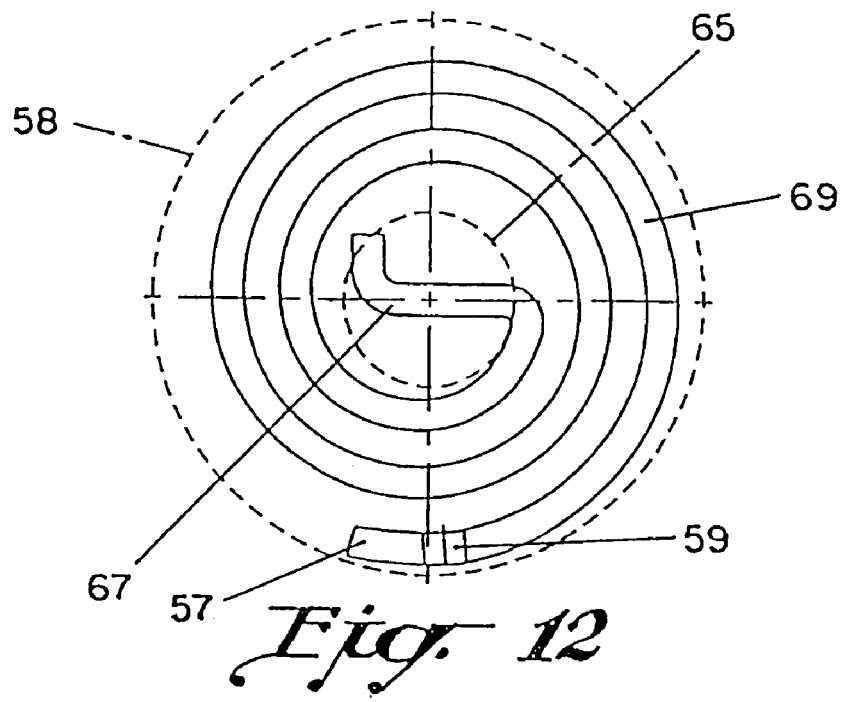
Figure 13:
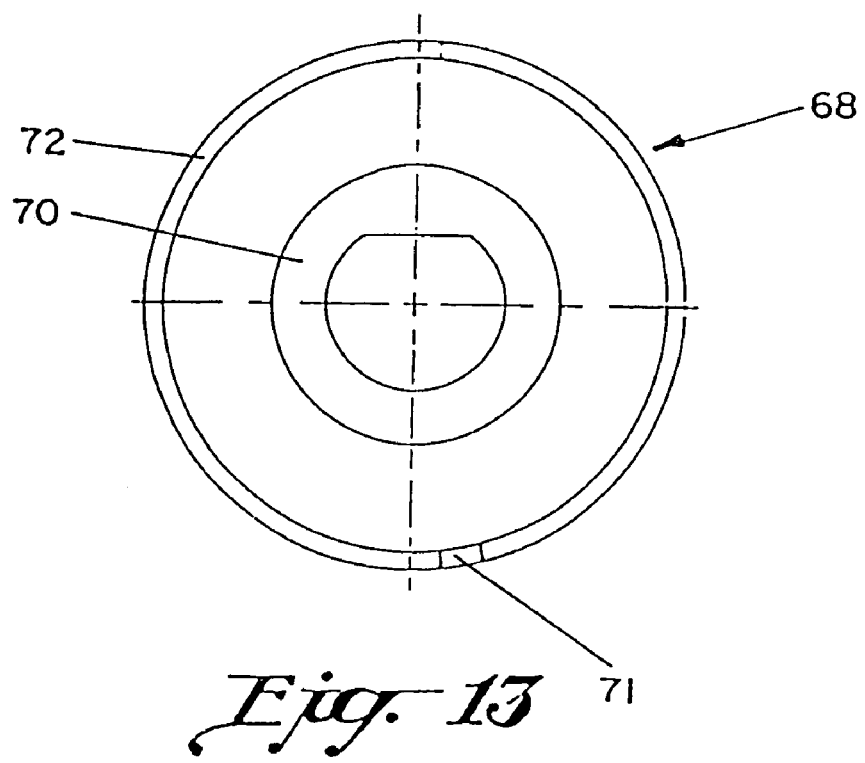
Figure 14:
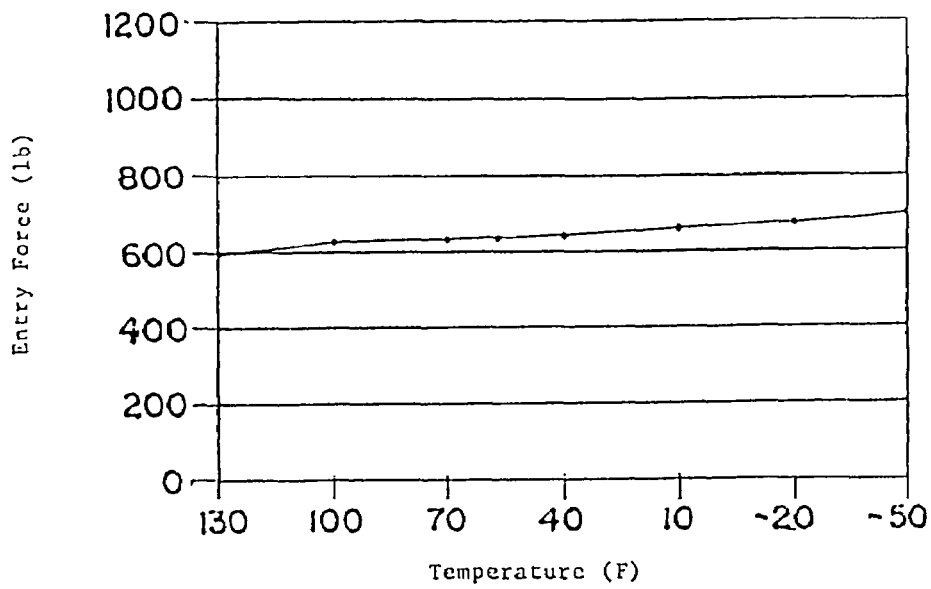
Figure 15:
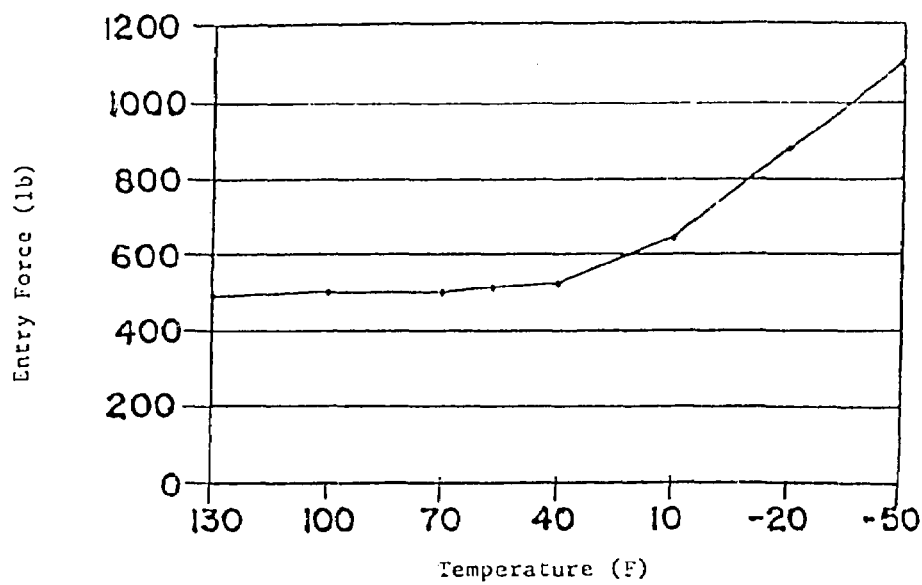
Figure 16:
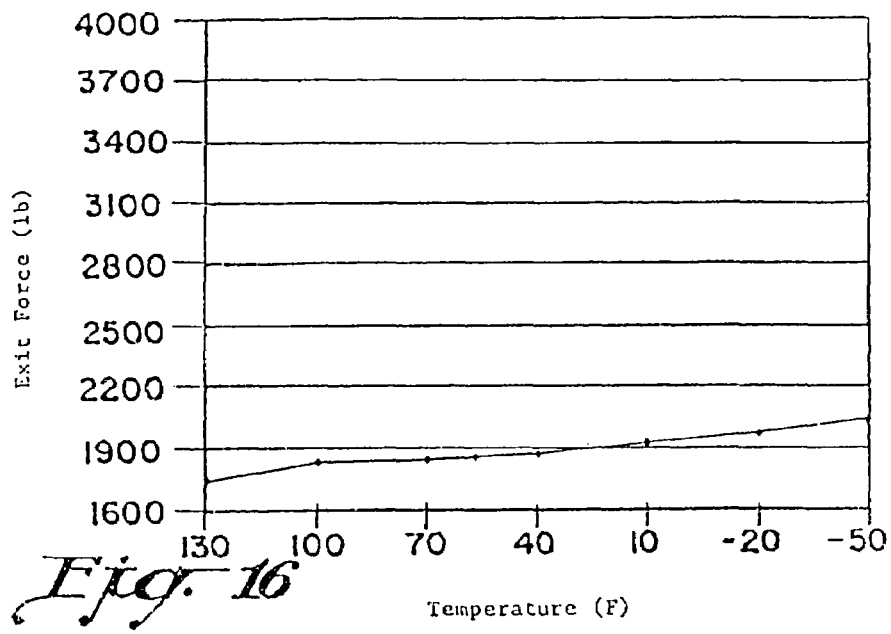
Figure 17:
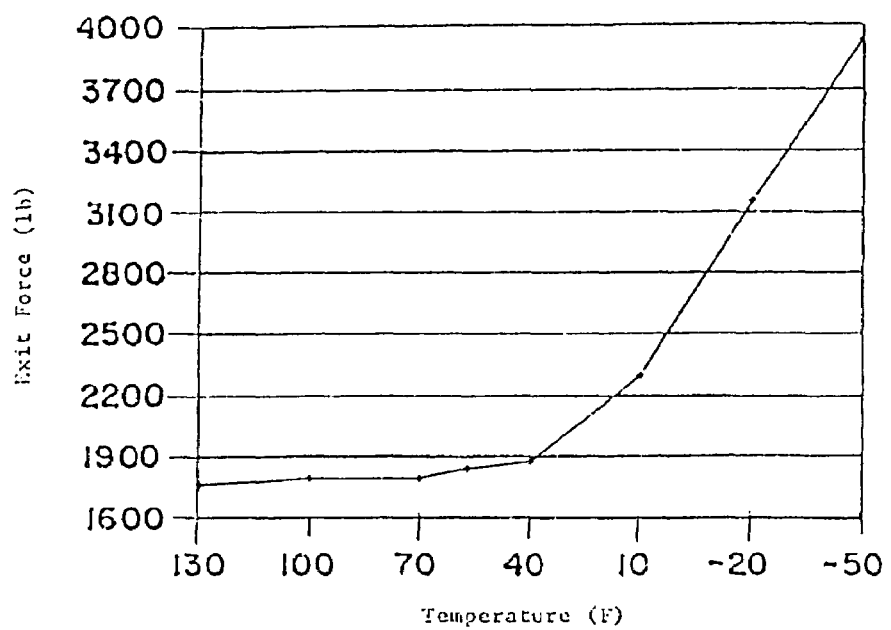
Figure 18:
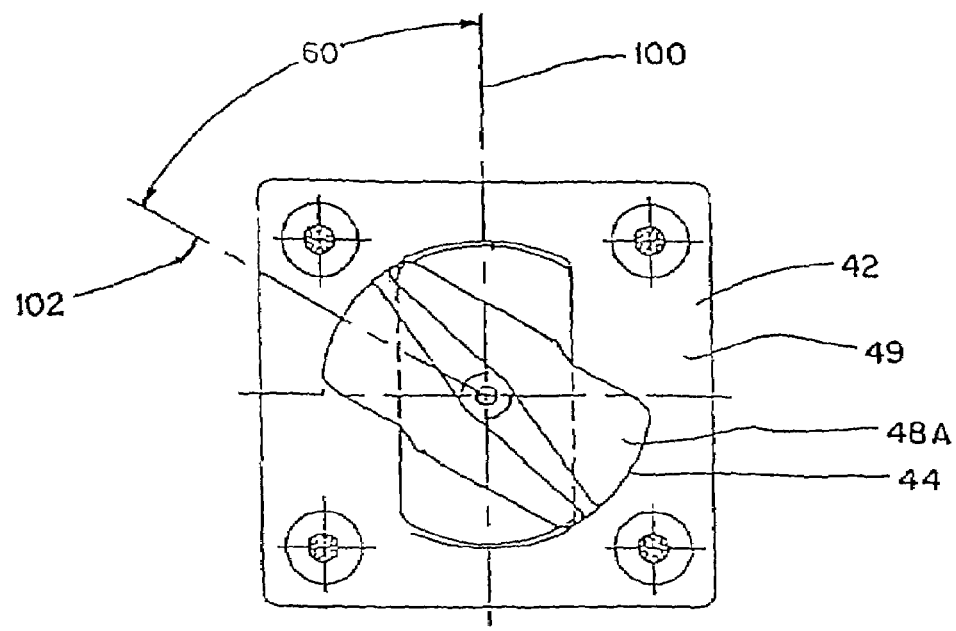
Figure 19:
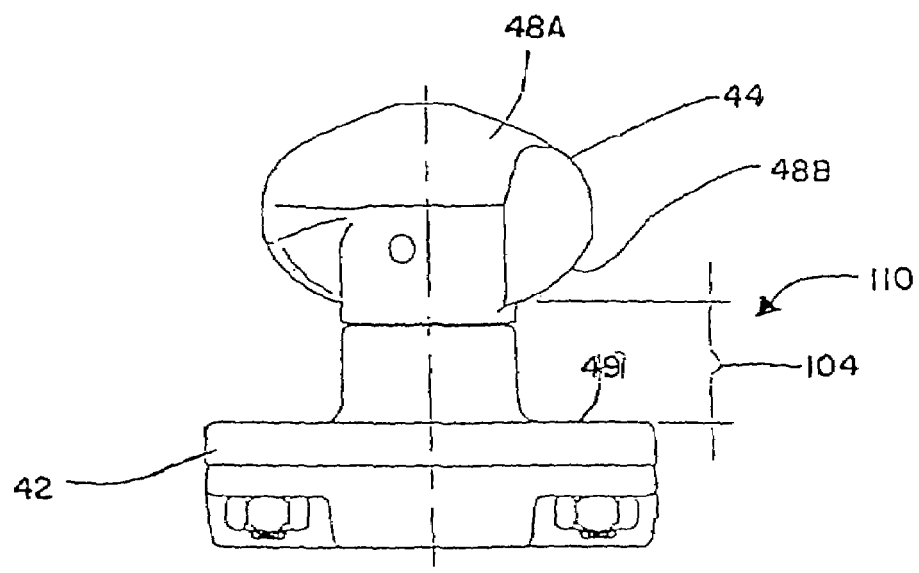
Figure 20:
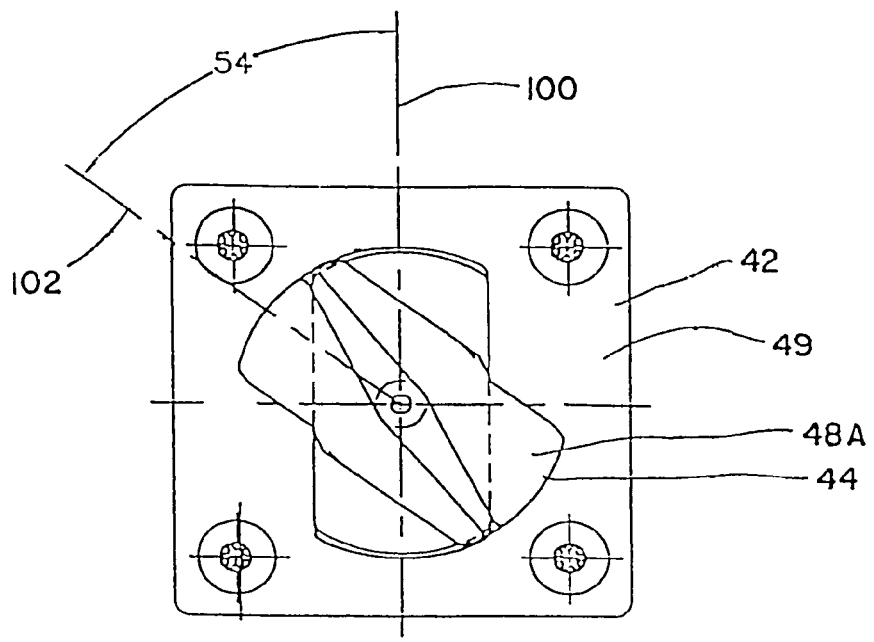
Figure 21:
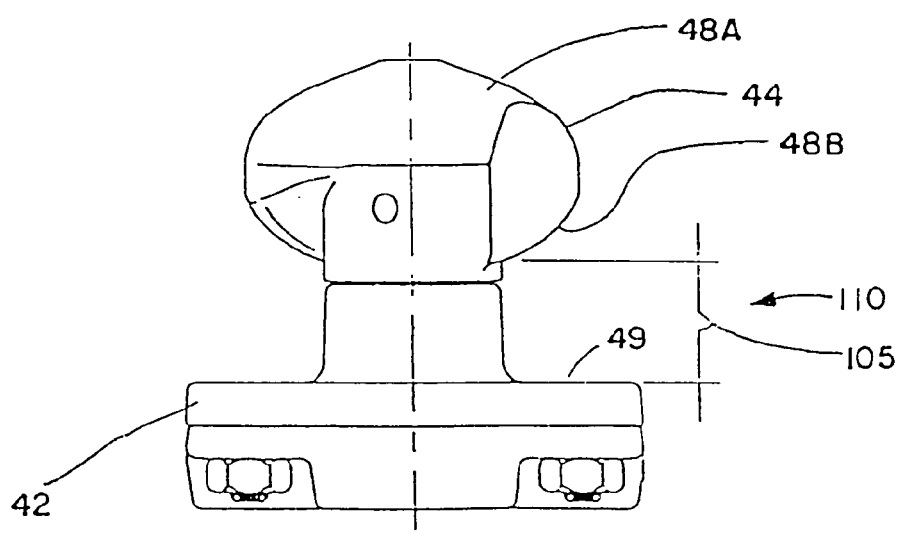
Figure 22:
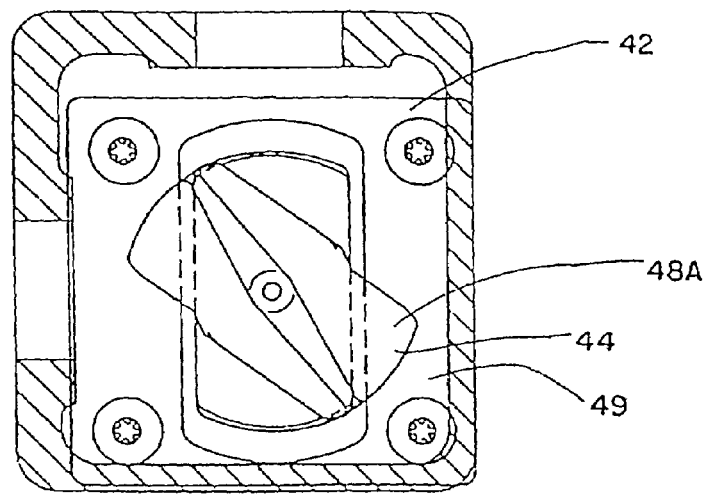
Figure 23:
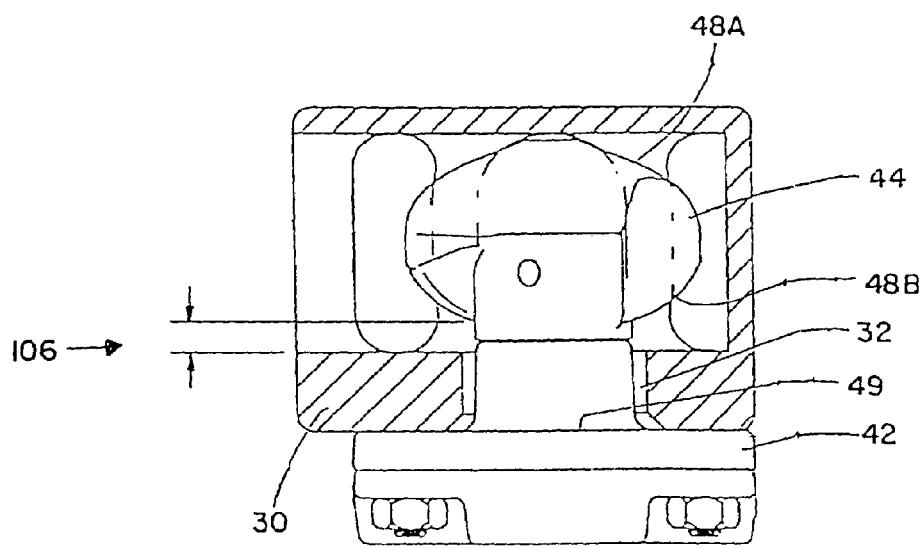
Figure 24:
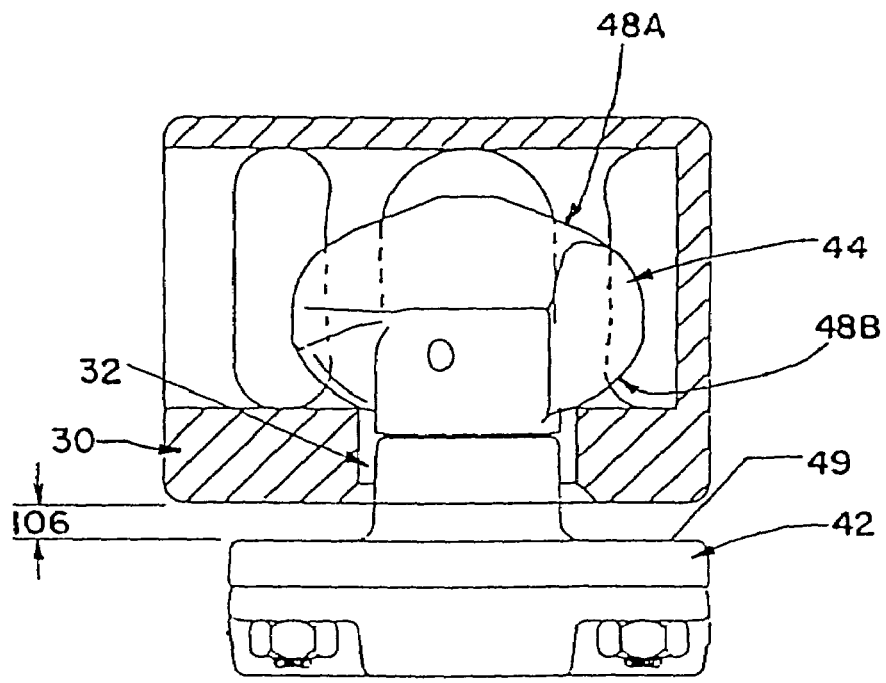
Figure 25:
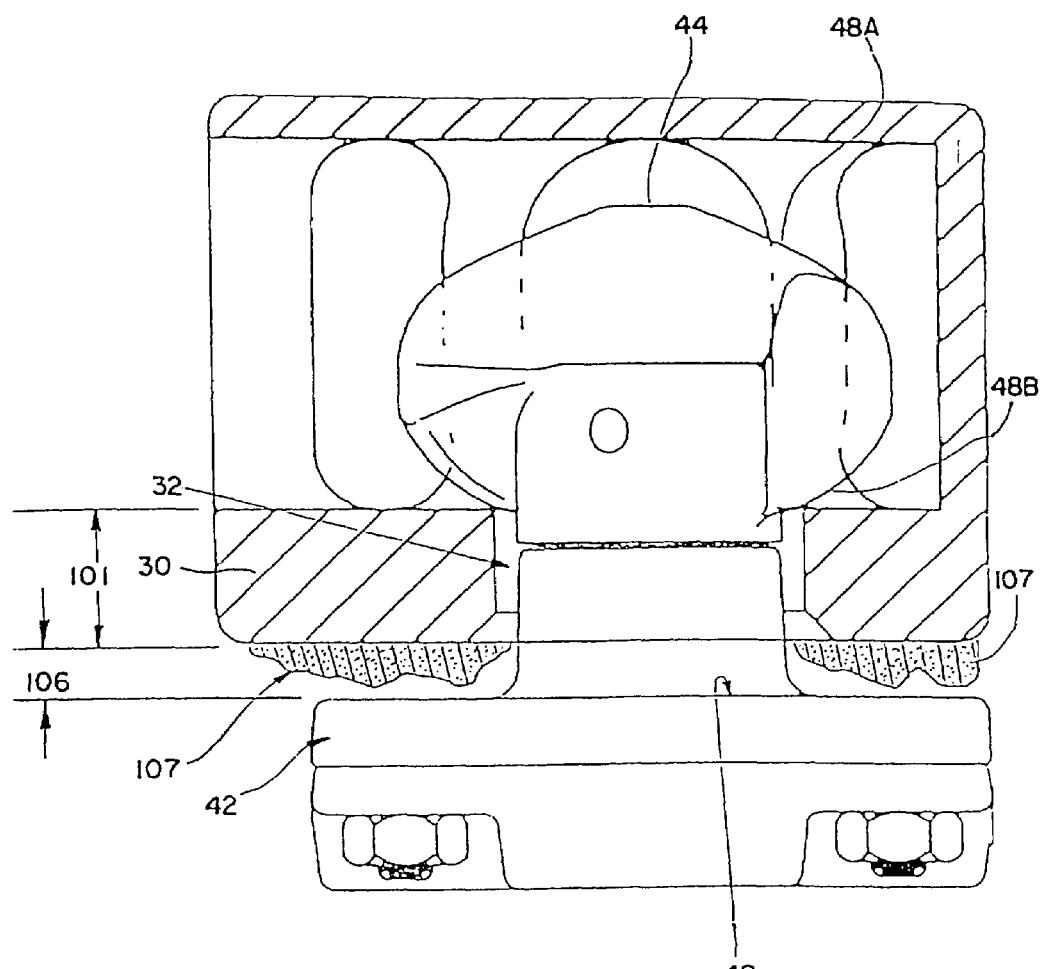

FIG. No. 3 is a first side plan view of a container securement device shown in a fully assembled state with a relaxed, locked offset head position.

FIG. No. 4 is an exploded side view of a container securement device shown in FIG. No. 3 with a relaxed, locked offset head position.

FIG. No. 5 is a side view of a container securement device shown in FIG. No. 3 with certain parts broken away to show otherwise hidden internal structure.

FIG. No. 6 is a first top plan view of the container securement device showing the head in a relaxed, locked offset head position.

FIG. No. 7 is a bottom plan view of the container securement device with an annular torsional spring removed to more clearly show a chamfered spring-receiving end of a prior art shaft.

FIG. No. 8 is a bottom plan view of the container securement device showing the annular torsional spring installed to show the cooperative association of the annular torsional spring with the spring-receiving end of the prior art shaft.

FIG. No. 9 is a bottom plan view of the container securement device with a torsional spring removed to more clearly show a chamfered and slotted spring-receiving end of the improved shaft of the present invention.

FIG. No. 10 is a bottom plan view of the container securement device with an annular torsional spring installed to show the cooperative association of the annular torsional spring with the spring-receiving end of the improved shaft of the present invention.

FIG. No. 11 is a bottom plan view of the container securement device with a spiral torsional spring installed to show the cooperative association of the spiral torsional spring with the spring-receiving end of the improved shaft of the present invention.

FIG. No. 12 is a bottom plan view of the spiral torsional spring as removed from the spring-receiving end of the improved shaft of the present invention and depicting a substantially concentric structural relation with a spring-receiving hollow of the base as shown in broken lines.

FIG. No. 13 is a bottom plan view of the annular torsional spring as removed from the spring-receiving end of the improved shaft of the present invention.

FIG. No. 14 is a graphical depiction of entry force (measured in pounds) as a function of temperature (measured in Fahrenheit) for a steel torsional spring element of the present invention.

FIG. No. 15 is a graphical depiction of entry force (measured in pounds) as a function of temperature (measured in Fahrenheit) for a rubber torsional spring element of the present invention.

FIG. No. 16 is a graphical depiction of exit force (measured in pounds) as a function of temperature (measured in Fahrenheit) for a steel torsional spring element of the present invention.

FIG. No. 17 is a graphical depiction of exit force (measured in pounds) as a function of temperature (measured in Fahrenheit) for a rubber torsional spring element of the present invention.

FIG. No. 18 is a first top plan view of the container securement device showing the head in an alternative offset head position with the longitudinal head axis offset from the longitudinal base axis by 60 degrees.

FIG. No. 19 is a side plan view of the container securement device shown in FIG. No. 18 with particular reference being drawn to an alternative gross clearance dimension intermediate the head and the superior base surface.

FIG. No. 20 is a top plan view of the container securement device showing the head in a preferred offset head position with the longitudinal head axis offset from the longitudinal base axis by 54 degrees.

FIG. No. 21 is a side view depiction of the container securement device shown in FIG. No. 20 with particular reference being drawn to a preferred gross clearance dimension intermediate the head and the superior base surface.

FIG. No. 22 is a fragmentary top view depiction of the container securement device shown in FIG. No. 20 as received in a container-borne, lock-actuating corner casting with parts broken away to show the relaxed, locked offset head position of the container securement device.

FIG. No. 23 is a side view depiction of the container securement device shown in FIG. No. 21 as received in a container-borne, lock-actuating structure with particular reference being drawn to a preferred net clearance dimension intermediate the head and an inferior horizontal wall portion of the lock-actuating corner casting with parts broken away to show the relaxed, locked offset head position of the container securement device.

FIG. No. 24 is a first side view depiction of the container securement device shown in FIG. No. 21 as received in a fragmentary, container-borne, lock-actuating corner casting with particular reference being drawn to a net clearance dimension intermediate the inferior horizontal wall portion of the lock-actuating corner casting and the superior base surface.

FIG. No. 25 is an enlarged side view depiction of the container securement device shown in FIG. No. 24 as received in a fragmentary, container-borne, lock-actuating corner casting depicting container-borne debris located within the net clearance dimension intermediate the inferior portion of the lock-actuating corner casting and the superior base surface.

DETAILED DESCRIPTION OF THE PREFERRED EMBODIMENT(S)

Referring now to the drawings, the preferred embodiment of the present invention concerns a container securement assembly 24 or system for securing an ISO type container 22 to a support structure 20 such as a carrier deck, which carrier deck is designed to haul ISO type containers through all types of environmental conditions, including often highly variable temperature conditions. Two ISO type containers 22 are illustrated and referenced in juxtaposed, end-to-end relation in superior adjacency to a support structure 20 in FIG. No. 1. Notably, the International Organization for Standardization (ISO) is an international standard-setting body composed of representatives from national standards bodies. The organization produces world-wide industrial and commercial standards, the so-called ISO standards. A standardized ISO type container (also known as an isotainer) can be loaded on support structures 20 of container ships, railroad cars, and trucks.

There are five common standard lengths of an ISO container, namely, 20 ft (6.1 m), 40 ft (12.2 m), 45 ft (13.7 m), 48 ft (14.6 m) and 53 ft (16.2 m). US domestic standard containers are generally 48 ft and 53 ft. Container capacity (of ships, ports, etc) is measured in twenty-foot equivalent units (TEU, or sometimes teu). A twenty-foot equivalent unit is a measure of containerized cargo capacity equal to one standard 20 ft (length)×8 ft (width)×8.5 ft (height) container. In metric units this is 6.10 m (length)×2.44 m (width)×2.59 m (height), or approximately 39 m$^3$. Most containers today are of the 40-ft variety and thus are 2 TEU. Forty-five ft containers are also designated 2 TEU. Two TEU are referred to as one forty-foot equivalent unit (FEU). These two terms of measurement are used interchangeably. So-called "high cube" containers have a height of 9.5 ft (2.9 m), while half-height containers, used for heavy loads, have a height of 4.25 ft (1.3 m).

Of critical structural importance to the present invention is the fact that standard ISO type containers comprise a lock-actuating opening as generally illustrated and referenced at 32 in FIG. No. 2. From an inspection of FIG. No. 1, it will be seen that each of the eight corners of each container 22 comprises a container-borne, lock-actuating structure or corner casting 28 having an upwardly or downwardly facing inferior portion of the lock-actuating corner casting 28 as may be described by a substantially horizontal wall 30 in which is formed the noncircular lock-actuating opening 32. The lock-actuating openings 32 are engageable by the securement devices 24 to achieve securement and automatic entry and release of the containers 22. Horizontal wall 30 and lock-actuating opening 32 are further illustrated and referenced in FIG. Nos. 23-25.

As will be seen from an inspection of FIG. No. 2, the lock-actuating opening 32 is preferably of a generally elongated or rectangular shape having a major axis generally parallel to the longest dimension of the container 22. Each lock-actuating opening 32 is defined by a perimeter including two relatively long side walls or head-engaging portions 34, which head-engaging portions 34 are joined by two somewhat rounded relatively short end walls 36. The head-engaging portions 34 and the end walls 36 of the lock-actuating openings 32 extend between the external and internal surfaces of the horizontal wall 30 of a corner casting 28. In order to effect securement of a container 22, the lock-actuating openings 32 should preferably comprise substantially parallel, opposing head-engaging portions 34.

In FIG. No. 1, it will be seen that there is illustrated in somewhat schematic form a support structure 20 upon which cargo containers 22 are to be secured by securement devices 24 constructed in accordance with the principles of the present invention. Support structure 20 may, for example, be the deck or floor of a rail car or other transport vehicle. When each container 22 is lowered onto support structure 20, the securement devices 24 automatically secure the containers 22 in place. The principles of the present invention are applicable to devices for securing various types of containers to various types of supports. In the illustrated embodiments of the invention, the containers 22 are of a standard and modular type.

The securement device 24 of the present invention is illustrated in more detail in FIG. Nos. 3-11. Securement device 24 preferably comprises a base or housing 42 as illustrated and referenced in FIG. Nos. 3-11 and 18-25; and a head 44 as illustrated and referenced in FIG. Nos. 1, 3-6, and 18-25. Head 44 is rotatable between locked and unlocked rotational head positions to effect selective securement or release of a cargo container 22 as is described in more detail hereinafter. FIG. Nos. 3-6 depict head 44 in a relaxed, locked rotationally offset head position. In the illustrated arrangement, each securement device 24 is adapted to be attached or secured to the support structure 20 by welding or fastening the base 42 to the support structure 20. Preferably, one securement device 24 is positioned in alignment with each of the four lower corner castings 28 of a container 22 as generally depicted in FIG. No. 1.

Base 42 preferably comprises upper and lower housing portions 54 and 56 as illustrated and referenced in FIG. No. 4; and certain spring end-fixing means. The spring end-fixing means may preferably be defined by a locator pin 55 and a locator pin receiving tunnel, the receiving tunnel being formed in lower housing portion 56 as generally depicted in FIG. No. 5. The upper and lower housing portions 54 and 56 are preferably secured together by suitable fasteners such as bolt down mechanisms and/or assemblies. For example, certain bolts 10 are illustrated and referenced in FIG. Nos. 4 and 6, and certain cooperative bolt-locking nuts 11 are illustrated and referenced in FIG. Nos. 4 and 7-11. The upper and lower housing portions 54 and 56 preferably define an internal chamber or cavity 58 as generally illustrated and referenced in FIG. No. 5, and as further depicted in phantom by broken lines in FIG. No. 12.

Notably, upper housing portion 54 preferably comprises a projecting shear block or boss 60 as illustrated and referenced in FIG. Nos. 3-5. It is contemplated that shear block 60 preferably comprises a shape similar to, but slightly smaller than, the lock-actuating opening 32. With the container 22 secured in the locked position, the shear block 60 is received in lock-actuating opening 32 to prevent movement of container 22 in any horizontal direction. In other words, the base 42 comprises a shear block 60 having a shape that is cooperable with the lock-actuating opening 32. Thereby, the shear block 60 may be received in the lock-actuating opening 32 when the container 22 is secured for preventing lateral container movement relative to the base 42. It is thus contemplated that the shear block 60 effectively functions to enhance container securement.

A shaft 62 is journalled for rotation in an opening defined at the center of shear block 60 as illustrated and referenced in FIG. No. 5. Shaft 62 comprises a head-receiving end 53 as illustrated and referenced in FIG. No. 5; and a spring-receiving end 65 as illustrated and referenced in FIG. Nos. 4, 5, and 9-12. From a comparative inspection of FIG. Nos. 4 and 5, it will be seen that the spring-receiving end 65 extends into the spring-receiving cavity 58. Head 44 is received by the head-receiving end 53 and is preferably attached thereto by means of a groove pin or key 64 so that shaft 62 and head 44 may rotate as a unit as generally depicted in FIG. No. 5. Within chamber 58, shaft 62 includes an enlarged hub portion 66 as illustrated and referenced in FIG. Nos. 4, 5, and 9. From a comparative inspection of FIG. Nos. 4 and 5, it will be seen that a select spring element 46 is connected between the hub 66 and the base 42 in order to resiliently hold the shaft 62 and head 44 in the locked rotational head position.

It should be noted that spring-receiving end 65 comprises both a chamfered spring-actuable transverse cross-section 63 and a spring-actuable groove 61 as generally illustrated and referenced in FIG. Nos. 9-11. From an inspection of the noted figures, it will be seen that the spring-actuable groove 61 extends through the spring-actuable transverse cross-section 63. In contradistinction to certain spring-receiving ends found or taught by the prior art, which ends typically comprise isolated spring-actuable transverse cross-sections (as generally depicted in FIG. Nos. 7 and 8), the shaft 62 of the present invention comprises a spring-receiving end 65 comprising at least two types of spring end actuating structures, namely, a uniquely configured transverse cross-section and an end-receiving groove extending through the transverse cross-section.

In accordance with features of the present invention, the securement device 24 preferably comprises a select spring element 46 for biasing or actuating the head 44 to the locked rotational head position, as well as a cam surface for rotating the head 44 as container 22 is raised or lowered. The select spring element 46 may be selected from at least two interchangeable spring elements, a selected interchangeable spring element being received in the spring-receiving cavity 58 and actuable intermediate the spring-receiving end 65 and the spring end-fixing means. Preferably, the support structure 20 may defined by a carrier deck and the base 42 may be removably secured to the carrier deck. The removably secured base 42 permits the user to selectively interchange the interchangeable spring elements depending on the user's considered election in view of certain environmental use factors.

In this last regard, it is contemplated that the selected interchangeable spring element 46 may be selected based upon its particular suitability for locale-specific temperature ranges. In other words, it is noted that containers 22 are displaced from one locale to another and thus are exposed to differing climactic conditions depending on the origin, destination, and route conditions. Certain spring elements are better equipped to respond to actuating forces depending on the ambient temperature and properties inherent in the material used in the construction of the spring element. For example, it is contemplated that sturdier, materials such as steel, may be preferred for use in regions exposed to relatively more extreme weather conditions with wide-ranging temperatures primarily as a means to decrease the likelihood of element failure and to enhance the predictability of lock performance to operators in the field who load and unload containers 22 in varying environmental conditions.

Conversely, less sturdy materials such as rubber may be preferred for use in regions exposed to relatively temperate weather conditions with narrowly ranging temperatures. In any event, it is contemplated that locale-specific temperature ranges may be definable or groupable into two ranges, namely, a temperate (or narrow) range and an extreme (or broad) range, the temperate and extreme ranges being defined relative to one another. In other words, that which is not temperate is extreme and that which is not extreme is temperate. For example, a certain extreme type temperature range may include an origin exposed to temperatures exceeding 110° (or an upper limit at +130° Fahrenheit (~+55° Celcius)) and a destination exposed to temperatures below 0° Fahrenheit (or a lower limit at –50° Fahrenheit (~–45° Celcius) (notably, in this last regard, the Association of American Railroads (AAR) requires that container securement devices, such as securement device 24, satisfy certain performance load ranges for a temperature range of +130° F. to –50° F.).

If the foregoing scenario may describe an extreme temperature range, a temperature range of 40° Fahrenheit to 80° Fahrenheit could very well describe a temperate temperature range (i.e. a range falling within the extreme temperature range). The central notion being addressed is that differing spring elements may be used for differing temperature ranges, the differing spring element being actuable via a single, uniquely configured shaft member, such as shaft 62. Thus, while a metallic, or preferably steel, torsional spring may be specified for use in target locations typically having a wide fluctuation in temperatures (such as North America or Asia), an elastomeric, or rubber, torsional spring may be well suited for use in target locations typically having a more tempered or narrow fluctuation in temperatures (such as Ireland).

As a rule of thumb, non-strained elastomers typically have a coefficient of expansion ten times that of steel, a fact that has been considered in the choice of materials used in the construction of the selectable spring elements of the present invention, as well as the spring-receiving cavity 58. Certain rubber materials, for example, may have an average coefficient of linear expansion on the order of $80 \times 10^{-6} (°\text{ C.})^{-1}$ while steel has an average coefficient of linear expansion on the order of $10–13 \times 10^{-6} (°\text{ C.})^{-1}$. The behavior of rubber in response to temperature changes, however, is more complex than the foregoing would seem to suggest. Whereas most materials exhibit a positive coefficient of linear expansion, that of elastomers changes from positive to negative values with increasing strain. The process effecting a change in sign of the coefficient of expansion is given the term "thermoelastic inversion".

It is further noted that elastomeric torsional springs tend to become more brittle and/or resistant to deformation at relatively low temperatures (–30° F.--40° F.) and thus often adversely affect the magnitude of entry and exit forces required to actuate the rotational movement of the head 44. In this regard, it will be seen from a comparative inspection of FIG. Nos. 14-17 that when temperatures drop below 40° Fahrenheit, rubber springs require a marked increase in entry and/or exit force to effect rotational movement of head 44. Indeed, at temperatures approaching the lower limit of the AAR specifications, the required exit force may approach 4,000 pounds for a rubber spring element. Even if a rubber or elastomeric spring were to remain functional at this temperature, it is doubtful whether many lift systems could provide the necessary exit force(s) to successfully remove secured containers 22 from support structures 20.

Given the complexity of principles relating to thermoelastic inversion as applied to an elastomeric torsional spring experiencing temperature fluctuations, and the fact that elastomeric torsional springs become more unpredictable in fluctuating temperatures, it is believed preferable to incorporate a metallic (or preferably steel) spiral spring into the securement device where practicable. Excellent results have been achieved utilizing certain annealed or tempered steel strips, such as 1090 annealed steel strip, but it is noted that certain alloyed steels have also been effective. Further, it is contemplated that certain stainless steels could be used when improved corrosion resistance is desired. Notably, the preferred steel is tempered to effect substantially uniform spring-actuating performance within a temperature range of +130° F. to −50° F. In all cases, spring-receiving cavity 58 is formed to volumetrically accept the dynamic temperature-dependent nature of the selected spring element 46 and allow for thermal expansion and contraction (whether linear or volumetric) of the materials composing the selected spring element 46.

The select spring element 46 may thus be selectively defined by an annular, torsional spring 68 of elastomeric and resilient material such as rubber as generally illustrated and referenced in FIG. Nos. 8, 10, and 13. At the inner and outer peripheries respectively, the annular, torsional spring 68 may be bonded or vulcanized to inner and outer rigid annular ring members 70 and 72 as illustrated and referenced in FIG. No. 13. Inner ring 70 (or the inner radial end of the annular spring) may preferably comprise a central shaft interface of certain noncircular geometric configuration for mating with the spring-receiving end 65. Outer ring 72 (or the outer radial end of the annular spring) may preferably comprise structure 71 cooperable with the spring end-fixing means for preventing rotational movement of the outer ring 72. The elastomeric material extends intermediate the inner ring 70 and outer ring 72 and thus may be actuated during rotational contact between the head-engaging portions 34 and the head 44 and further may be relaxed during disengagement of head 44 from the head-engaging portions 34.

As introduced hereinabove, the select spring element 46 may also be defined by a spiral, torsional spring 69 formed of relatively more predictable metallic material such as steel, which spring 69 is generally illustrated and referenced in FIG. Nos. 11 and 12. At the inner periphery of the spiral, torsional spring 69 is a central shaft interface or first spring end 67 as illustrated and referenced in FIG. Nos. 11 and 12. It will be seen from an inspection of the noted figures that first spring end 67 is designed to mate with groove 61. Opposite the first spring end 67 of spiral torsional spring 69 is a second spring end 57 comprising certain structure 59 for cooperating with the spring end-fixing means for preventing rotational movement of the second spring end 57 as generally illustrated and referenced in FIG. No. 12.

Whether an annular torsional spring or a spiral torsional spring, the inner periphery of the select spring element 46 is thus fixed with respect to shaft 62, while the outer periphery is fixed with respect to base 42. The select spring element 46 consequently serves as a torsion spring biasing head 44 continually to its locked position. The spring force or spring constant is chosen to cooperate with the cam outer surface of head 44 to provide a desired entry and exit force encountered when the container 22 is lowered onto or lifted off of support structure 20. The spring force or constant may be varied by selection of the configuration and characteristics of materials of the spring body.

The head 44 and the cam outer surface is generally symmetrical about its axis of rotation and the axis of shaft 62 as may be seen from an inspection of FIG. No. 6. In the spring-relaxed, locked rotationally offset head position, head 44 is not aligned with lock-actuating opening 32, and container 22 is secured in position because head 44 overlies portions of the corner casting horizontal wall 30. By interaction of the outer cam surface and the perimeter of the lock-actuating opening 32, the head 44 can be rotated (via spring-actuation) to an unlocked or loading rotational head position during the action of which the head 44 can move relative to the container 22 through the lock-actuating opening 32.

The outer cam surface preferably comprises an upper locking or loading surface 48A as illustrated and referenced in FIG. Nos. 3-5, and 18-25 19, 21, and 23-25; and a lower unlocking or unloading surface 48B as referenced in FIG. Nos. 3, 4, 19, 21, and 23-25. The upper locking or loading surface 48A is directed generally away from base 42, and the lower unlocking or unloading surface 48B directed generally toward the base 42. The upper and lower surfaces 48A and 48B are shaped to interact with the perimeter of the lock-actuating opening 32 as the head 44 moves into or out of the corner casting 28. Furthermore, the upper and lower surfaces 48A and 48B are shaped somewhat differently from one another so that the force required for the head 44 to enter the lock-actuating opening 32 is smaller than the force required for the head 44 to exit from the lock-actuating opening 32. In this regard, it should be noted that the locking surface 48A is convexly shaped relative to the unlocking surface 48B for effecting a dynamically (or continually-changing) forced locking engagement and the unlocking surface comprises a substantially planar contact portion for effecting a substantially statically (or unchanging) forced unlocking engagement.

The select spring element 46, when in a relaxed, unactuated state, normally holds head 44 in the locked rotational head position as has been illustrated. In this position, the head 44 is angularly offset from the shear block 60 and cannot freely move through the lock-actuating opening 32. As a container 22 is lowered toward support structure 20, the perimeter of the lock-actuating opening 32 and specifically the head-engaging portions 34 engage the upper locking surface 48A. As lowering of container 22 continues the reaction between the upper locking surface 48A and the lock-actuating opening 32 results in a torque applied around the axis of head 44 and shaft 62. This torque results in deformation of the select spring element 46 as head 44 rotates from the relaxed, locked rotational head position toward the actuated, unlocked rotational head position. As head 44 reaches the loading position, it is able to move through lock-actuating opening 32 and beyond wall 30 into the corner casting 28. As head 44 clears wall 30, the select spring element 46 returns the head 44 to the relaxed, locked rotational head position so that the container 22 is thereafter secured in place. The variable entry force required to rotate head 44 during loading of container 22 onto support surface 20 may range from 100 up to about 800 pounds as may be gleaned from an inspection of FIG. Nos. 14 and 15.

From a further inspection of FIG. Nos. 16 and 17, it will be seen that when container 22 is removed from support structure 20, a substantially larger force is required due to the configuration of the lower unlocking surface 48B. More specifically, as container 22 is lifted, the perimeter of lock-actuating opening 32 engages lower unlocking surface 48B. The resultant force applies a torque about the axis of shaft 62 deforming the select spring element 46 and permitting head 44 to rotate from the relaxed, locked rotationally offset head position to the actuated, unlocked rotationally aligned head position. Head 44 thereby moves out of corner casting 28 through the lock-actuating opening 32 and beyond wall 30. Thereafter, the select spring element 46 returns the head 44 to its locked offset head position. The exit force required during lifting of container 22 from the support structure 20 may, for example, preferably ranges up to about 2,200 pounds. It will thus be seen that the locking surface 48A effects a variable entry force during insertion of the head 44 into the lock-actuating opening 32 and the unlocking surface 48B effects a substantially uniform exit force during removal of the head 44 from the lock-actuating opening 32, the ratio of the required exit force to the required entry force ranging from about 1 to 22.

A further key feature of the present invention stems from certain structural cooperation between the relaxed, locked offset head position (as generally depicted in FIG. Nos. 18-25) and the lower unlocking sloped surface 48B. From an inspection of the noted figures, it will be seen that the base or housing 42 may be said to further preferably comprise a longitudinal base axis 100 as referenced in FIG. Nos. 18 and 20; and a superior base surface 49 as referenced in FIG. Nos. 18-25. The longitudinal base axis 100 preferably extends in parallel relation to the head-engaging portions 34 of the container-borne, lock-actuating structure or corner casting 28. The wall portion 30 has a certain structural wall thickness or opening thickness as referenced at 101 in FIG. No. 25.

Head 44 may be said to preferably comprise a longitudinal head axis 102 as referenced in FIG. Nos. 18 and 20. It will be seen from an inspection of the noted figures that the longitudinal head axis 102 is preferably angled from the longitudinal base axis 100 when in the relaxed, locked offset head position. The degree of offset or the magnitude of the intermediate-axis angle (depicted as 60 degrees in FIG. Nos. 18 and 19; and depicted as 54 degrees in FIG. Nos. 20 and 21) is considered application-critical or critical in certain applications. In this last regard, it will be recalled the lower unlocking surface 48B is sloped. The degree of offset thus results in a certain gross clearance dimension intermediate the surface 48B and the superior base surface 49 as generally referenced at 110 in FIG. Nos. 19 and 21. For example, given an intermediate-axis angle of 60 degrees, the resulting gross clearance dimension 110 is preferably formed to result in a 1.625 inch dimension 104 as referenced in FIG. No. 19. This dimension is useful in certain applications, for example, where debris is unlikely to accumulate adjacent horizontal wall portion 30. Given an intermediate-axis angle of 54 degrees, the resulting gross clearance dimension 110 is preferably formed to result in a 1.6875 inch dimension as referenced at 105 in FIG. No. 23. Thus, it will be understood that with intermediate-axis angles of less than 54 degrees, resulting clearance dimensions 110 will gradually increase in magnitude with a 1.6875 inch clearance dimension representing the lower end of the range. Notably, the intermediate-axis angle tends to 0 rotational degrees when the head 44 moves through the lock-actuating opening 32 resulting in the actuated, unlocked aligned head position previously specified.

Greater clearance dimensions 110 are thus useful in applications where the accommodation of container-borne debris and/or matter may result in a non-uniform structural thickness at the horizontal wall portion 30, which may, in turn, result in lock failure. For example, the lock head 44 may fail to return to the locked offset head position and remaining in contact with the head-engaging portions 34, thereby resulting in a failing locked engagement. When debris accumulates, this foregoing situation becomes more readily apparent in practice. To guard against this potentiality, an offset of 54 degrees in applications settings where debris is likely to accumulate, is preferred.

Notably, both of the clearance dimensions 104 and 105 are greater in magnitude than the structure thickness of horizontal wall 30, the difference therebetween representing a net clearance dimension 106 as generally referenced in FIG. Nos. 23-25 (the net clearance dimension 106 as referenced represents the difference of gross clearance dimension 105 and structural wall thickness 101 as may be seen from an inspection of FIG. No. 25. FIG. No. 23 generally depicts clearance dimension 106 that would result if the lock-actuating structure or corner casting 28 would rest flat onto the superior base surface 49 of the device. In actual practice this is not always true because container-borne debris 107 such as sand or dirt sticks to the bottom of the lock-actuating structure (as generally illustrated and referenced in FIG. No. 25) and becomes sandwiched between the superior base surface 49 and the inferior surface of horizontal wall 30. FIG. No. 24 generally depicts clearance dimension 106 as the inside edge or superior surface of horizontal wall 30 at the head-engaging portions 34 makes contact with the lower unlocking surface 48B. In certain applications, larger gross clearance dimensions 110 and net clearance dimensions 106 are required due to the high likelihood that container-borne debris or matter will accumulate as depicted in FIG. No. 25. Preferably, the gross clearance dimension 110 should be no less than about 1.6875 inches, the preferred base clearance dimension for accommodating container-borne matter located in inferior adjacency to the lock-actuating structure effecting a non-uniform structural thickness 101.

It should also be further noted that differing offsets will necessarily effect differing entry/exit load requirements. In this regard, it will be recalled from an inspection of FIG. Nos. 16 and 17 that when container 22 is removed from support structure 20, a substantially larger force is required due to the configuration of the lower unlocking surface 48B. More specifically, as container 22 is lifted, the perimeter of lock-actuating opening 32 engages lower unlocking surface 48B. The resultant force applies a torque about the axis of shaft 62 deforming the select spring element 46 and permitting head 44 to rotate from the relaxed, locked rotationally offset head position to the actuated, unlocked rotationally aligned head position. Head 44 thereby moves out of corner casting 28 through the lock-actuating opening 32 and beyond wall 30. Thereafter, the select spring element 46 returns the head 44 to its locked offset head position. The exit force required during lifting of container 22 from the support structure 20 may, for example, preferably ranges up to about 2,200 pounds. It will thus be seen that the locking surface 48A effects a variable entry force during insertion of the head 44 into the lock-actuating opening 32 and the unlocking surface 48B effects a substantially uniform exit force during removal of the head 44 from the lock-actuating opening 32, the ratio of the required exit force to the required entry force given the specified offset falling within the range of about 1 to 22.

It will thus be understood that the container securement system of the present invention preferably comprises a base 42; a shaft 62; a head 44; and at least two types of interchangeable spring elements, as preferably defined by including an annular torsional spring 68 and a spiral torsional spring 69. The base 42 is adapted to be secured to the container support 20 and comprising a spring-receiving cavity 58 and certain spring end-fixing means. The shaft 62 is supported by the base 42 and is rotatable about an axis of rotation extendable through a lock-actuating opening 32 formed in a container to be secured. The shaft comprises a head-receiving end 53 and a spring-receiving end 65. The spring-receiving end 65 extends into the spring-receiving cavity 58. The head 44 is carried by the head-receiving end 53 and is adapted to rotate through the lock-actuating opening 32 under forceful contact with certain head-engaging portions 34 of the opening 32. The head comprises an upper locking surface 48A and a lower unlocking surface 48B.

The two interchangeable spring elements lead the user to a selected spring element 46, which selected spring element 46 is received in the spring-receiving cavity 58 and is actuable intermediate the spring-receiving end 65 and the spring end-fixing means by container-provided forces as the head-engaging portions 34 contact the head 44. The head-engaging portions 34 apply torque to the shaft 62 via the head 44. The head 44 is thus movable through the lock-actuating opening 32 when in an actuated, unlocked, rotational head position and immovable through the lock-actuating opening 32 when in a relaxed, locked rotational head position. The locked rotational head position thus functions to prevent head movement through the lock-actuating opening 32 for selectively securing the container 22 to the support 20.

The selected interchangeable spring element 46 is preferably a torsional type spring being selected from the group consisting of an annular torsional spring and a spiral torsional spring. The torsional spring will comprise a select material, the select material being selected from the group consisting of an elastomeric material and a metallic material for enabling effective use of the container securement assembly in variable ambient temperatures.

While the above description contains much specificity, this specificity should not be construed as limitations on the scope of the invention, but rather as an exemplification of the invention. For example, as is described hereinabove, it is contemplated that the present invention essentially discloses a container securement device for securing a container to a support, the container having a lock-actuating opening, the lock-actuating opening comprising opposing head-engaging portions. The container securement device comprises a base, a shaft, a head, and a spring element. The base is adapted to be secured to the support. The shaft is supported by the base and is rotatable about an axis of rotation extendable through the lock-actuating opening. The shaft comprises a head-receiving end and a spring-receiving end, the spring-receiving end comprising spring-actuable end-receiving structure.

The head is carried by the head-receiving end and adapted to rotate through the lock-actuating opening under forceful contact with the head-engaging portions. The head comprises an upper locking surface and a lower unlocking surface, the locking surface being convexly shaped relative to the unlocking surface for effecting a dynamically forced locking engagement and the unlocking surface comprising a substantially planar contact portion for effecting a substantially statically forced unlocking engagement.

The spring element comprises a central shaft interface for interfacing with the end-receiving structure thereby being actuable via the spring-receiving end by container-provided forces as the head-engaging portions contact the head. The head is thus movable through the lock-engaging opening when in an actuated, unlocked, rotational head position and being immovable through the lock-engaging opening when in a relaxed, locked rotational head position, the locked rotational head position for preventing head movement through the lock-actuating opening for selectively securing the container to the support.

Accordingly, although the invention has been described by reference to a preferred embodiment, it is not intended that the novel kit be limited thereby, but that modifications thereof are intended to be included as falling within the broad scope and spirit of the foregoing disclosure, the following claims and the appended drawings.

I claim:

1. A container securement assembly, the container securement assembly for securing a container to a support, the container having a lock-actuating opening, the lock-actuating opening having opposing head-engaging portions and an opening thickness, the container securement assembly comprising:

a base adapted to be secured to the support, the base comprising a spring-receiving cavity, spring end-fixing means, a longitudinal base axis, and a superior base surface, the longitudinal base axis extending in parallel relation to the head-engaging portions;

a shaft supported by the base, the shaft being rotatable about an axis of rotation extendable through the lock-actuating opening, the shaft comprising a head-receiving end and a transversely noncircular spring-receiving end, the spring-receiving end extending into the spring-receiving cavity and comprising spring-actuable end-receiving structure, the end-receiving structure extending transversely through the spring-receiving end;

a head, the head comprising a longitudinal head axis and a sloped outer head surface, the longitudinal head axis being angled from the longitudinal base axis thereby forming an intermediate-axis angle, the intermediate-axis angle being no greater than 54 rotational degrees thereby forming a relaxed, locked, offset head position, the head being mounted to the head-receiving end in the offset head position, the sloped outer head surface being adapted to rotate through the lock-actuating opening under forceful contact with the head-engaging portions, the sloped outer head surface comprising an upper locking sloped surface and a lower unlocking sloped surface;

a torsional spring element, the torsional spring element being received in the spring-receiving cavity and comprising a central shaft interface, the central shaft interface interfacing with the end-receiving structure, the torsional spring element thereby being actuable intermediate the spring-receiving end and the spring end-fixing means by container-provided forces as the head-engaging portions contact the head, the head-engaging portions for applying torque to the shaft via the head, the head being movable through the lock-actuating opening when in an actuated, unlocked, aligned head position, the intermediate-axis angle tending to 0 rotational degrees when the head moves through the lock-actuating opening, the head being immovable through the lock-actuating opening when in the offset head position, the intermediate-axis angle and the lower unlocking sloped surface being cooperable to effect a clearance dimension intermediate the head and the superior base surface, the clearance dimension being no less than about 1.6875 inches, the clearance dimension for accommodating container-borne matter, the container-borne matter being located in adjacency to the lock-actuating opening effecting a non-uniform opening thickness, the offset head position for preventing head movement through the lock-actuating opening for selectively securing the container to the support.

2. The container securement assembly of claim 1 wherein the torsional spring element is formed from tempered steel, the tempered steel for enabling substantially uniform spring-actuating performance within variable ambient temperatures, the variable ambient temperatures ranging from about 55° Celcius to about −45° Celcius.

3. The container securement assembly of claim 1 wherein the support is defined by carrier deck and the base is adapted to be removably secured to the carrier deck, the removably secured base permitting a user to selectively interchange a metallic spiral torsional spring with an elastomeric annular torsional spring, the elastomeric annular spring comprising a noncircular central shaft interface, the noncircular central shaft interface for actuable interfacing engagement with the spring-receiving end.

4. A container securement device, the container securement device for securing a container to a support, the container having a lock-actuating opening, the lock-actuating opening comprising opposing head-engaging portions and an opening thickness, the container securement device comprising:
 a base adapted to be secured to the support, the base comprising a longitudinal base axis and a superior base surface;
 a shaft supported by the base, the shaft being rotatable about an axis of rotation extendable through the lock-actuating opening, the shaft comprising a head-receiving end and a spring-receiving end, the spring-receiving end comprising spring-actuable end-receiving structure;
 a head, the head comprising a longitudinal head axis and a sloped outer head surface, the longitudinal head axis being angled from the longitudinal base axis thereby forming an intermediate-axis angle, the intermediate-axis angle being no greater than 54 rotational degrees thereby forming a relaxed, locked, offset head position, the head being mounted to the head-receiving end in the offset head position, the sloped outer head surface being adapted to rotate through the lock-actuating opening under forceful contact with the head-engaging portions, the sloped outer head surface comprising an upper locking sloped surface and a lower unlocking sloped surface, the locking sloped surface being convexly shaped relative to the unlocking sloped surface for effecting a dynamically forced locking engagement, the unlocking sloped surface comprising a substantially planar contact portion for effecting a substantially statically forced unlocking engagement;
 a spring element, the spring element comprising a central shaft interface, the central shaft interface interfacing with the end-receiving structure, the spring element thus being actuable via the spring-receiving end by container-provided forces as the head-engaging portions contact the head, the head thus being movable through the lock-actuating opening when in an actuated, unlocked, aligned head position, the intermediate-axis angle tending to 0 rotational degrees when the head moves through the lock-actuating opening, the head being immovable through the lock-actuating opening when in the offset head position, the intermediate-axis angle and the lower unlocking sloped surface being cooperable to effect a clearance dimension intermediate the head and the superior base surface, the clearance dimension being no less than about 1.6875 inches, the clearance dimension for accommodating container-borne matter, the container-borne matter being located in adjacency to the lock-actuating opening effecting a non-uniform opening thickness, the offset head position for preventing head movement through the lock-actuating opening for selectively securing the container to the support.

5. The container securement device of claim 4 wherein the spring element is a torsional spring, the torsional spring being selected from a spring group, the spring group consisting of an annular spring and a spiral spring, the annular and spiral springs defining interchangeable spring elements, the torsional spring comprising a select material, the select material being selected from the group consisting of an elastomeric material and a metallic material.

6. The container securement device of claim 5 wherein the torsional spring is selected based upon locale-specific temperature ranges, the locale-specific temperature ranges being definable by a temperate range and an extreme range, the temperate and extreme ranges being defined relative to one another, an elastomeric torsional spring being selectable for use in the temperate range and a metallic torsional spring being selectable for use in the extreme range.

7. The container securement device of claim 6 wherein the torsional spring is formed from tempered steel, the tempered steel for enabling substantially uniform spring-actuating performance within variable ambient temperatures, the variable ambient temperatures ranging from about 55° Celcius to about −45° Celcius.

8. The container securement device of claim 5 wherein the support is defined by carrier deck and the base is adapted to be removably secured to the carrier deck, the removably secured base permitting a user to selectively interchange the annular torsional spring with the spiral torsional spring, the annular spring comprising a noncircular central shaft interface, the noncircular central shaft interface for actuable interfacing engagement with the spring-receiving end.

9. A container securement device, the container securement device for securing a container to a support, the container having a lock-actuating opening, the lock-actuating opening comprising opposing head-engaging portions and an opening thickness, the container securement device comprising:
 a base adapted to be secured to the support, the base comprising a longitudinal base axis and a superior base surface;
 a shaft supported by the base, the shaft being rotatable about an axis of rotation extendable through the lock-actuating opening, the shaft comprising a head-receiving end and a spring-receiving end, the spring-receiving end comprising spring-actuable end-receiving structure;
 a head, the head comprising a longitudinal head axis and a sloped outer head surface, the longitudinal head axis being angled from the longitudinal base axis thereby forming an intermediate-axis angle, the intermediate-axis angle being no greater than 54 rotational degrees thereby forming a relaxed, locked, offset head position, the head being mounted to the head-receiving end in the offset head position, the sloped outer head surface being adapted to rotate through the lock-actuating opening under forceful contact with the head-engaging portions, the sloped outer head surface comprising an upper locking sloped surface and a lower unlocking sloped surface;
 a spring element, the spring element comprising a central shaft interface and being formed from tempered steel, the central shaft interface interfacing with the end-receiving structure, the spring element being actuable via the spring-receiving end by container-provided forces as the head-engaging portions contact the head, the tempered steel for enabling substantially uniform, spring-actuating performance within variable ambient temperatures, the variable ambient temperatures ranging from about 55° Celcius to about −45° Celcius, the head being movable through the lock-actuating opening when in an actuated, unlocked, aligned head position, the intermediate-axis angle tending to 0 rotational degrees when the head moves through the lock-actuating opening, the head being immovable through the lock-engaging opening when in the offset head position, the intermediate-axis angle and the lower unlocking sloped surface being cooperable to effect a clearance dimension intermediate the head and the superior base surface, the clearance dimension being greater than the opening thickness, the clearance dimension for accommodating container-borne matter, the container-borne matter being located in adjacency to the lock-actuating opening effecting a non-uniform opening thickness, the offset head position for preventing head movement through the lock-actuating opening for selectively securing the container to the support.

10. The container securement device of claim 9 wherein the intermediate-axis angle is no greater than 54 rotational degrees and the clearance dimension is no less than about 1.6875 inches, the intermediate-axis angle and the clearance dimension for accommodating a non-uniform opening thickness less than 1.6875 inches.

* * * * *